No. 861,081. PATENTED JULY 23, 1907.
J. Q. BLUE & G. H. MARQUARDT.
MOTOR PLOW CARRIAGE.
APPLICATION FILED FEB. 28, 1906.
5 SHEETS—SHEET 1.
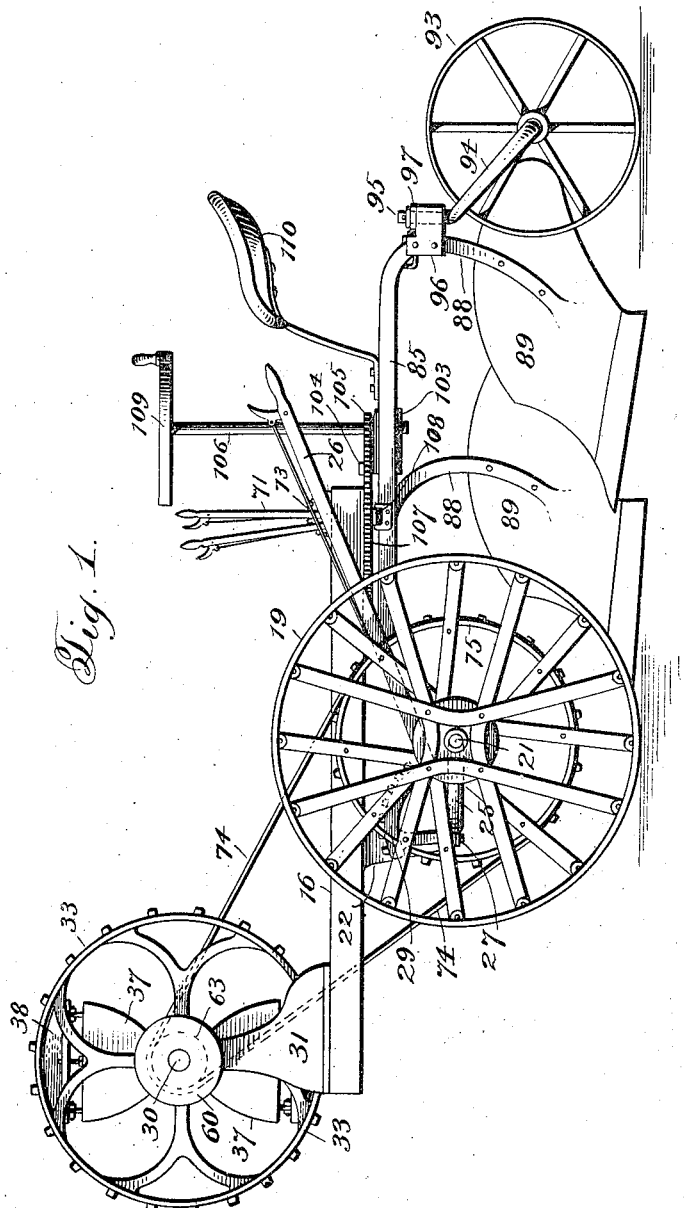

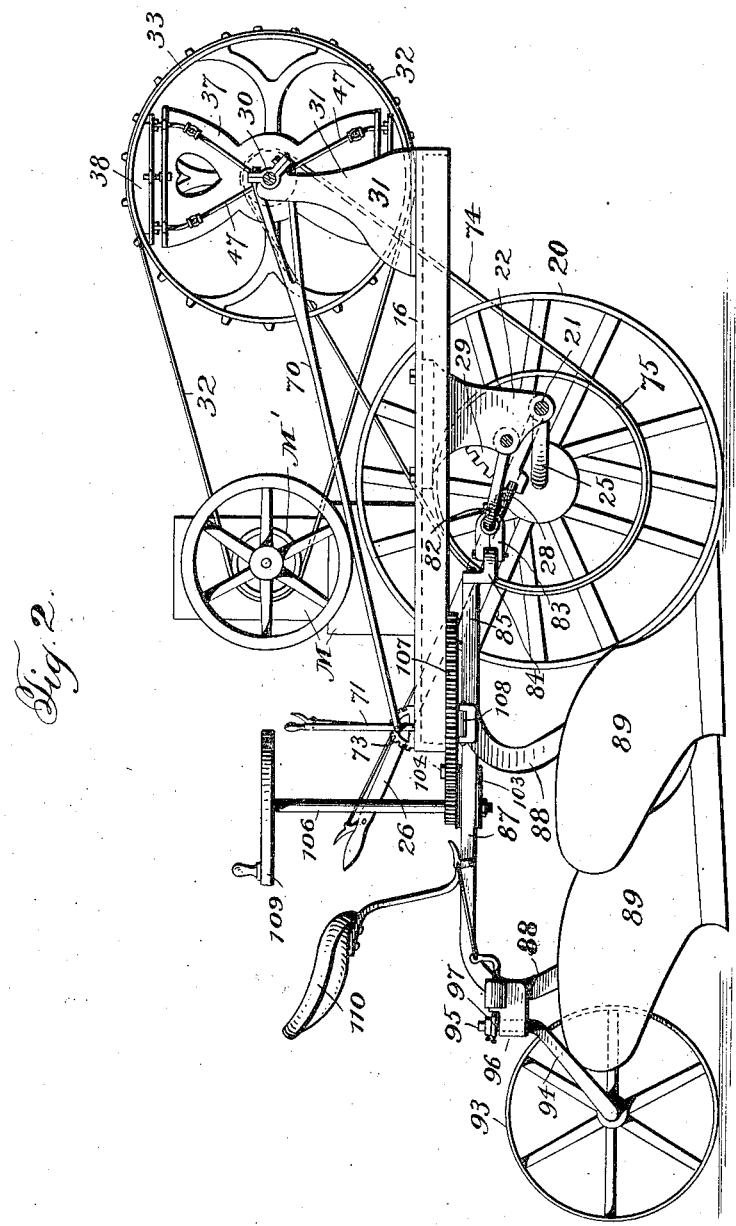

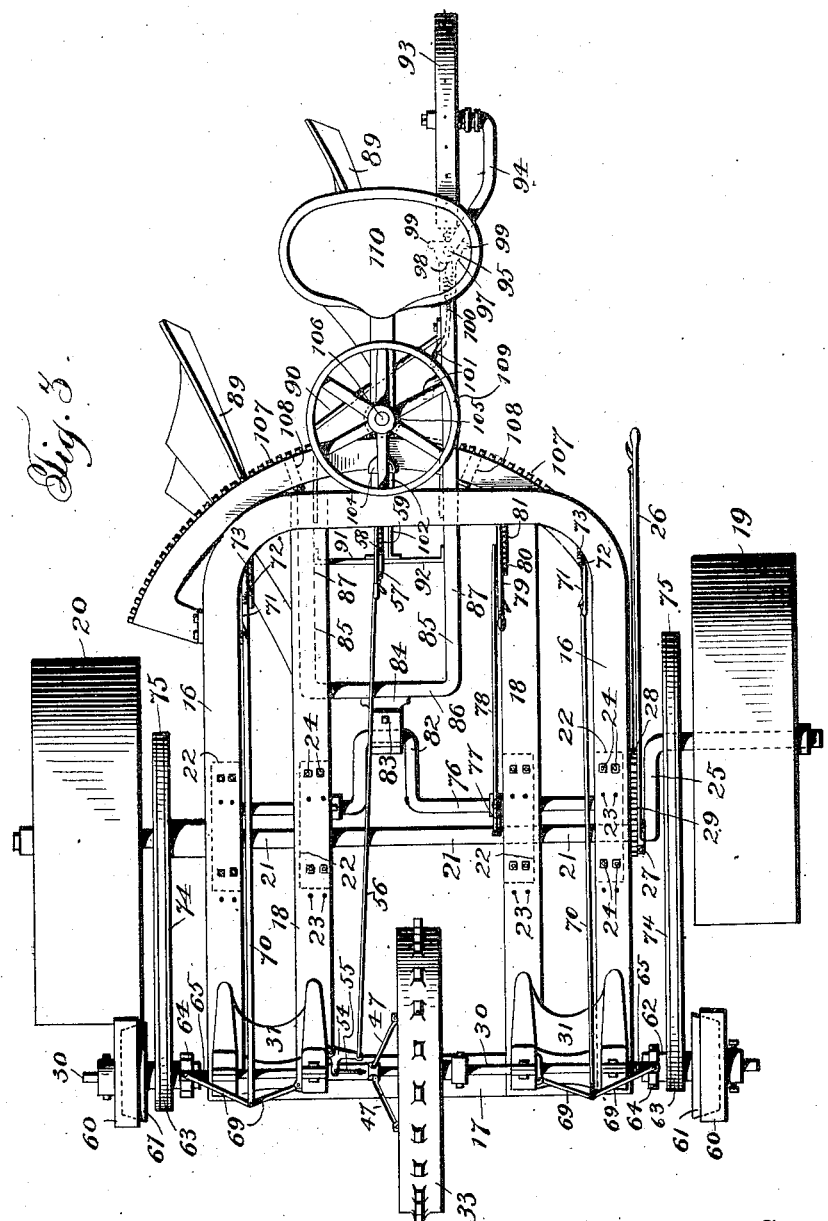

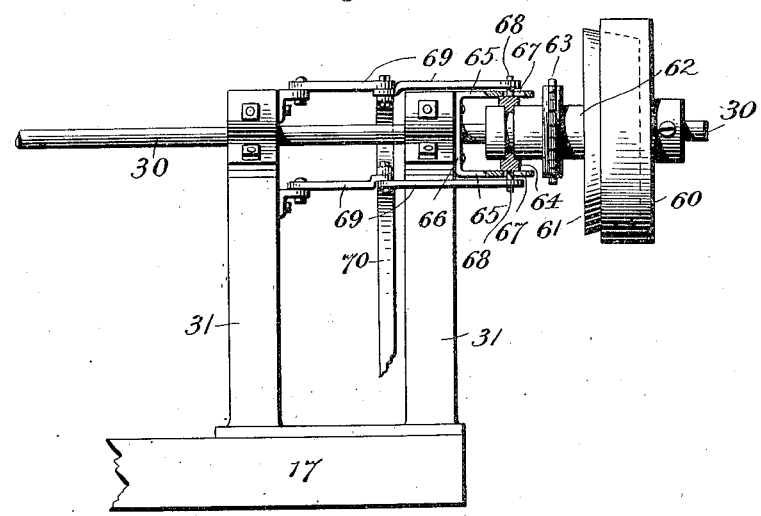
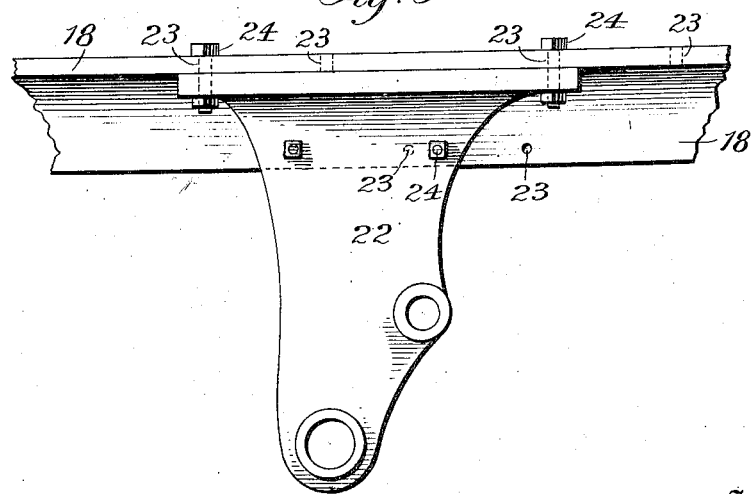

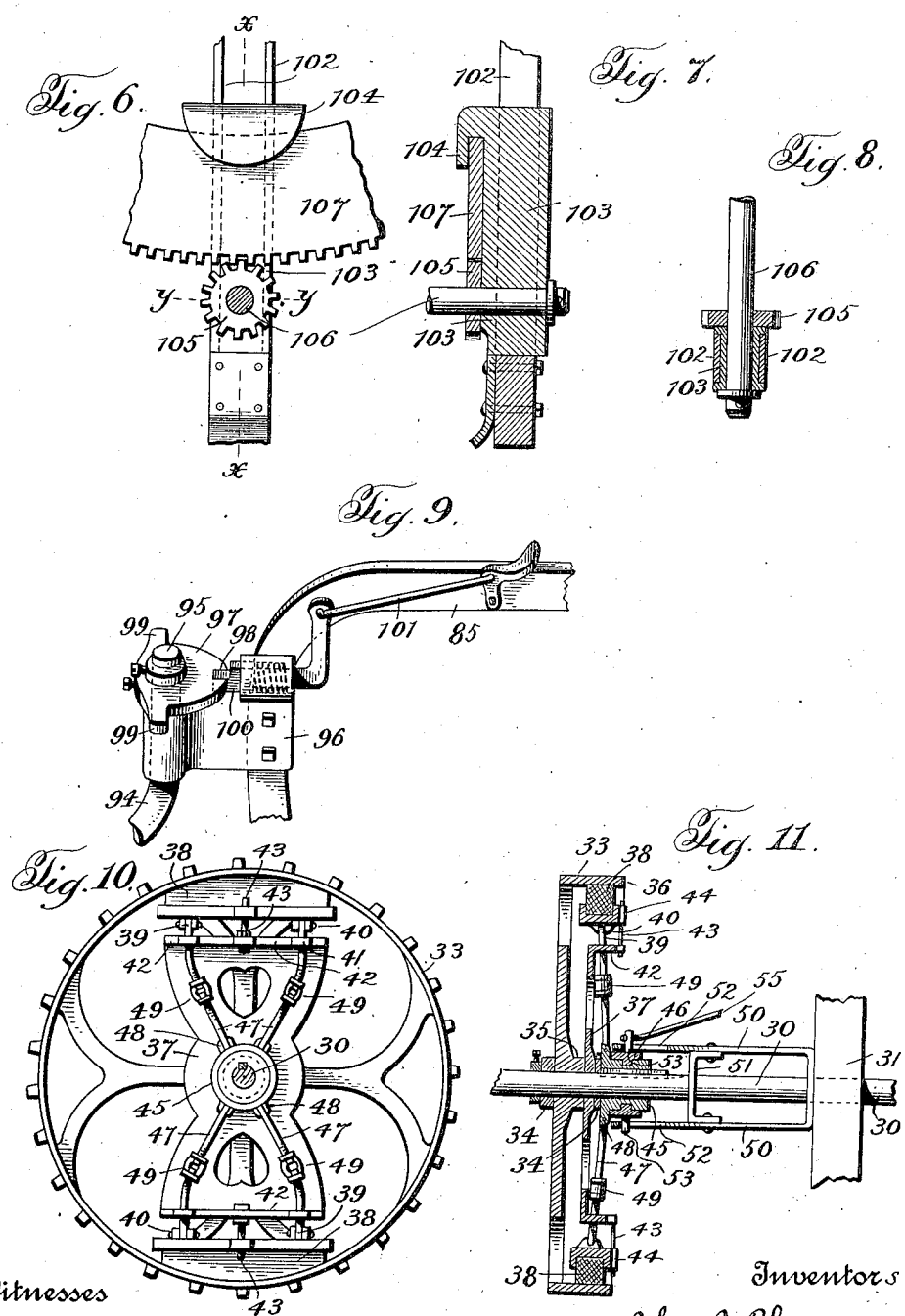

UNITED STATES PATENT OFFICE.

JOHN Q. BLUE AND GUSTAVUS H. MARQUARDT, OF SOUTH HAVEN, KANSAS.

MOTOR-PLOW CARRIAGE.

No. 861,081.     Specification of Letters Patent.     Patented July 23, 1907.

Application filed February 28, 1906. Serial No. 303,477.

*To all whom it may concern:*

Be it known that we, JOHN Q. BLUE and GUSTAVUS H. MARQUARDT, citizens of the United States, residing at South Haven, in the county of Sumner and State of Kansas, have invented certain new and useful Improvements in Motor-Plow Carriages, of which the following is a specification, reference being had therein to the accompanying drawing.

This invention relates to mechanically-driven agricultural machines or vehicles, and it provides a motor-actuated carriage for plows and similar implements which may possess any or all of the following advantageous features:

The various parts of the machine are so constructed and arranged as to provide an implement of very substantial construction, capable of long, efficient, and continuous service, and so organized as to be easily operable.

The machine includes means whereby the carriage is caused to turn at the end of a furrow, or where otherwise necessary, by operation of the main supporting-wheels, means under control of the operator being provided for readily effecting this movement.

Simple means are provided for quickly and readily throwing the actuating mechanism, as a whole or separate parts thereof, into or out of operation at will.

Means are provided whereby the tilt of the plows can be easily altered, the depth of plowing changed, and the plows lifted entirely from the ground, any or all of these operations being capable of performance while the machine is either in motion or at rest.

Readily operable means within easy reach of the operator are embodied in the machine for guiding the same while in operation.

Provision is made for changing the position of certain parts of the machine to meet changing conditions of service or different weights placed upon the carriage.

The operating-levers, guiding-wheel, and means for controlling the motor are assembled within easy reach of the operator without leaving his seat.

The details of construction and arrangement of parts contemplated by this invention are disclosed in the accompanying drawings, forming part hereof, wherein a preferable embodiment of the invention is shown, for purposes of illustration, as applied to a plow-carriage.

In the drawings, like reference characters refer to corresponding parts in the several views, of which—

Figure 1 is a view showing the land side of the implement; Fig. 2 is a view, partly in section, showing the furrow side of the implement; Fig. 3 is a plan view of the implement with parts omitted; Fig. 4 is a front view of part of the implement showing the clutch and drive devices, one of the clutch and drive mechanisms being shown in section; Fig. 5 is a detail view of one of the supporting-brackets; Fig. 6 is a detail top view of a portion of the steering mechanism; Fig. 7 is a sectional view, taken on the line $x-x$, Fig. 6; Fig. 8 is a sectional view, taken on the line $y-y$, Fig. 6; Fig. 9 is a detail view of the caster-wheel support; Fig. 10 is a detail side view of the main drive-wheel; and Fig. 11 is a sectional view of the main drive-wheel.

Throughout this application, for the purpose of distinguishing one from the other, the main land-wheels are designated as the supporting-wheels, the trailing wheel at the rear of the machine as the caster-wheel, the large drive-wheel on the drive-shaft as the main drive-wheel, and the smaller drive-wheels near the ends of the drive-shaft as the secondary drive-wheels.

The machine includes a main frame comprising a U-shaped member 16 which forms the outer longitudinal members of the frame and the rear cross member, a cross-member 17 which is attached to the forward ends of member 16, and longitudinal members 18 attached to the cross-member 17 and to the cross part of member 16.

The main frame is carried by supporting-wheels 19 on the land side and 20 on the furrow side, journaled on an axle 21 secured to the frame by brackets 22 attached to the under sides of members 16 and 18.

A plurality of sets of apertures 23 are provided in the main frame-members to accommodate bolts 24 which secure the brackets 22, in order that those brackets may be shifted to properly balance the machine for different weights and to meet other varying conditions.

Axle 21 is formed in the shape of a crank with arm 25 on the land side where the land-side supporting-wheel 19 is journaled, in order that the frame may be raised and lowered and the land-side supporting-wheel may be adjusted for different depths of furrow. An operating-lever 26 for raising and lowering the land-side supporting-wheel is fulcrumed on axle 21, is attached to the crank-arm 25 near the journal of the supporting-wheel by a strap 27, and has a hand-controlled pawl 28 which is coöperable with a ratchet-segment 29 attached to one of brackets 22. A drive-shaft 30 is journaled in standards 31 attached to the top of frame-members 16 and 18 near the front of the machine.

The machine is driven by any suitable motor M located on top of the main frame, power being transmitted from wheel $M^1$ of the motor by means of a belt 32 to the main drive-wheel 33 situated at or about the center of and loose upon the drive-shaft 30. Standards 31 are of sufficient height to enable the main drive-wheel to clear the cross-member 17.

The main drive-wheel 33 is held in place on shaft 30 by collars 34 attached to the shaft on each side of hub 35 of the wheel. The rim 36 of the drive-wheel 33 is extended to one side to form a flat interior periphery, unobstructed by the spokes. Between hub 35 and the collar 34 on the same side as the projecting rim 36, a clutch-member 37 is journaled on shaft 30. Member 37 carries shoes 38 arranged to engage the interior periphery of rim 36, each of said shoes being held by arms 39 pivotally attached thereto by joints 40 and passing through apertures 41 in the laterally-projecting portion 42 of member 37. For the purpose of taking up some of the strain between each shoe 38 and member 37, a guide 43 is attached to projecting portion 42 upon which the slide 44 of the shoe is movable. Adjacent to member 37 on shaft 30 is splined an axially-movable sleeve 45 upon which is held by tongue-and-groove construction a circumferential ring 46. Rods or links 47 are connected with sleeve 45 by joints 48 and to arms 39 by joints 49.

To one of standards 31 is attached a retaining device comprising projecting arms 50, one above and one below shaft 30, said arms being braced apart by a stay 51, and each arm being provided with a slot 52, wherein a projecting pin 53 of ring 46 is adapted to slide. This retaining device is to prevent rotation of ring 46 with sleeve 45.

Attached to standards 31, one above and one below shaft 30, are pivoted leaders 54, to one arm of each of which is attached a rod 55 connected with a pin 53 of ring 46, and to the other arms of which are attached the forked ends of a rod 56 which leads toward the rear of the machine and is connected at its rear end with an operating-lever 57. Lever 57 has a hand-controlled pawl 58 which is coöperable with a fixed ratchet-segment 59, whereby the lever is held in desired position.

By operation of lever 57 sleeve 45 is moved to cause the shoes 38 to engage or be disengaged from rim 36, the shoes being thrown against the rim when the sleeve is moved toward the main drive-wheel and released therefrom when the movement is in opposite direction.

At or near each end of shaft 30 is a fixed clutch-member 60, with which a clutch-member 61 loose upon said shaft is arranged to be coöperable. Each member 61 is formed with an elongated hub 62 which has thereon a secondary drive-wheel 63, and a circumferential ring 64 is held loose on said hub by tongue-and-groove construction.

Attached to each outside standard 31 and projecting outwardly is a retaining device comprising arms 65, one above and one below shaft 30, said arms being braced apart by a stay 66, and each arm being formed with a slot 67 wherein a projecting pin 68 of ring 64 is adapted to slide. This retaining device is to prevent rotation of ring 64 with hub 62.

Pivotally connected with each pin 68 of ring 64 and with one of standards 31, one above and one below shaft 30 for each ring, are jointed rods 69, to which are connected at or near the joints the forked ends of a rod 70. Each rod 70 leads and is attached to an operating-lever 71, which has a hand-controlled pawl 72 coöperable with a fixed ratchet-segment 73, whereby the lever is held in desired position. By movement of a lever 71 and its connections with ring 64, the clutch-members 60 and 61 are engaged or disengaged to throw a secondary drive-wheel 63 into or out of operation. The secondary drive-wheels 63 are connected by belts 74 with wheels 75, one attached to each of the supporting-wheels 19 and 20.

Rotatably mounted in brackets 22 in rear of axle 21 is a shaft 76, having an arm 77 thereon which is pivotally connected with a link 78 which leads to an operating-lever 79. Lever 79 has a hand-controlled pawl 80 thereon coöperable with a fixed ratchet-segment 81.

At or about the center of shaft 76 is a rearwardly-extending bell-crank 82, to which is pivotally connected a shackle 83, which in turn is pivotally connected with a tongue 84 of a plow-frame 85.

Plow-frame 85 comprises a front cross-member 86 to which tongue 84 is connected, and beams 87 extending rearwardly therefrom and having down-turned portions 88 to which any suitable plow elements 89, such as moldboards shown in the drawings, or disks, etc., are connected. Diagonal member 90 and cross-members 91 and 92 connect and brace beams 87. A trailing plow-frame is thus formed.

To the rear end of land-side beam 87 is attached a caster-wheel 93 to support the rear part of the plow-frame 85. The caster-wheel is journaled on the lower end of the trailing portion 94 of spindle 95, and the spindle is journaled in the bearing 96 secured to the beam. A collar 97 is secured to spindle 95 above bearing 96. Besides holding the spindle in the bearing, collar 97 coöperates to control the swing of the caster-wheel. For this purpose the collar is formed on the side opposite the wheel with a recess 98, and at approximately ninety degrees from each side of said recess with lugs 99. A spring-controlled latch 100 secured to bearing 96 normally seats in recess 98 and holds the caster-wheel in substantially the line of draft. In turning the plow, latch 100 is released from recess 98 by foot-controlled link 101, when the caster-wheel is free to swing in either direction, the swing being limited by engagement of latch 100 with one or the other of lugs 99; and, when the turning movement is completed, and the caster-wheel again trails in the line of draft, the latch will be returned to recess 98 by action of its spring.

Between and parallel with beams 87 is a bifurcated member 102 connected with and supported by cross-members 92 and 91. Between the parts of bifurcated member 102 is held a slidable block 103. The forward part of block 103 is formed with a rearwardly-overlapping lip or lug 104, and oppositely disposed thereto is a pinion 105 carried on a steering shaft 106 journaled in block 103. Attached to the main frame is a cogged arc 107, which is operable between pinion 105, with which it meshes, and lip 104, which holds it in mesh with said pinion. The engagement of lip 104 with arc 107 also serves to maintain the proper relation between the main and plow frames. Attached to beams 87, and interposed therebetween and arc 107, are anti-friction rollers 108, which are arranged to sustain strain between the main frame and the plow-frame and to permit movement of said frames with respect to each other. A steering-wheel 109 is attached to shaft 106, and a seat 110 for the operator is attached to the rear end of member 102.

The steering-wheel, the operating-levers hereinbefore described, and the controlling means of the motor are in easy reach of the operator on the seat.

When it is desired to turn the machine at the end of a furrow, or at other times, the secondary drive-wheel on the side to which the machine is to be turned is thrown by its operating-lever out of operation, and the machine is carried around by the other secondary drive-wheel actuating its supporting-wheel, in an obvious manner. The plows in the ground and the operation of the arc and pinion also assist in the turning movement. The turning movement being completed, the idle secondary drive wheel is again thrown into operation.

In making a long turn, the clutch-members of one of the secondary drive devices may be brought tightly together, and the clutch-members of the other secondary drive device brought together so as to be allowed to slip more or less as desired, to drive its supporting-wheel with less speed than that on the other side.

Further, the machine is steered without coöperation of the supporting-wheels by means of the operation by the operator of the pinion in mesh with the cogged arc, thus serving to swing the trailing frame and guide the implement.

The plow-frame is tilted by up or down movement of the bell-crank caused by movement of the operating-lever connected with its shaft. The slight forward or aft movement of the plow-frame incident to this operation is allowed for by the sliding block carrying the steering-pinion.

The main frame is raised or lowered on the land-side supporting-wheel by movement of the cranked end of the axle on that side caused by actuation of the operating-lever connected therewith.

After the motor is started, the driving mechanism is put into or thrown out of operation by movement of the clutch coöperable with the main drive-wheel. Joints 40 permit the shoes to take the proper set against the main drive wheel-rim, and joints 49 connecting arms 39 and rods 47 and joints 48 connecting rods 47 and sleeve 45 permit the requisite axial movement of said sleeve.

Having thus described our invention, what we claim as new, and desire to secure by Letters Patent, is—

1. In a plow-carriage, the combination with supporting-wheels, of a single drive-shaft, a main drive-wheel loose on said drive-shaft, means whereby motion from main drive-wheel is applied to and released from said drive-shaft, secondary drive-wheels loose on said drive-shaft and operatively connected with said supporting-wheels, and means associated with each secondary drive-wheel and independent of said main drive-wheel whereby motion from said drive-shaft is applied to and released from said secondary drive-wheels.

2. A plow-carriage comprising a frame, supporting-wheels, a drive-shaft, a main drive-wheel on said shaft, means whereby motion from said main drive-wheel is applied to and released from said drive-shaft, secondary drive means connected with each supporting-wheel, and means whereby motion from said drive-shaft is applied to and released from said secondary drive means.

3. A plow-carriage comprising a frame, supporting-wheels, a drive-shaft, a main drive-wheel on said shaft, means whereby motion from said drive-wheel is applied to and released from said drive-shaft, and secondary drive means comprising clutch-members on said drive-shaft and connected with each supporting-wheel.

4. In a plow-carriage, a drive-shaft, and actuating means therefor comprising a drive-wheel loosely mounted on said drive-shaft, a member including a shoe engageable with said drive-wheel, a sleeve splined on said shaft and connected with said shoe, a ring loose on said sleeve and having a projecting pin, a fixed arm having a slot therein through which said pin projects, and means connected with said ring whereby said sleeve is axially moved.

In testimony whereof we affix our signatures in presence of two witnesses.

JOHN Q. BLUE.
GUSTAVUS H. MARQUARDT.

Witnesses:
JAMES A. BLACK,
JAMES R. MCGREGOR.